United States Patent [19]
Wisting

[11] 3,989,488
[45] Nov. 2, 1976

[54] MULTI-STAGE AIR SCRUBBING UNIT

[76] Inventor: Walter L. Wisting, 5 Oakdale Road, Branford, Conn. 06405

[22] Filed: Mar. 17, 1975

[21] Appl. No.: 558,887

[52] U.S. Cl. .............................. 55/238; 55/257 R; 55/263; 261/79 A
[51] Int. Cl.² ................... B01D 47/06; B01D 47/12
[58] Field of Search ................ 55/84, 93, 94, 223, 55/226, 235–239, 249, 257, 263, 241, 459; 261/79 A

[56] References Cited
UNITED STATES PATENTS

| | | | |
|---|---|---|---|
| 283,724 | 8/1883 | Rowlett | 55/263 |
| 1,264,263 | 4/1918 | Brassert | 55/236 |
| 1,265,763 | 5/1918 | Fender | 55/459 X |
| 1,585,358 | 5/1926 | Arkwright | 55/241 X |
| 2,057,579 | 10/1936 | Kurth | 55/223 |
| 2,579,282 | 12/1951 | Vicard | 55/257 |
| 2,585,440 | 2/1952 | Collins | 55/223 X |
| 2,792,905 | 5/1957 | Forrest | 55/239 |
| 2,976,949 | 3/1961 | Murphy et al. | 55/223 |
| 3,395,510 | 8/1968 | Barnes | 55/94 |
| 3,550,356 | 12/1970 | Abboud | 55/236 |
| 3,605,386 | 9/1971 | Erwin et al. | 55/263 X |

FOREIGN PATENTS OR APPLICATIONS

| | | | |
|---|---|---|---|
| 452,137 | 8/1936 | United Kingdom | 55/94 |

Primary Examiner—Frank W. Lutter
Assistant Examiner—David L. Lacey
Attorney, Agent, or Firm—Haynes N. Johnson

[57] ABSTRACT

An air scrubber employing means which cause the air entering the scrubber to follow a circular path is provided for removing solid, liquid and gaseous contaminants from air. Removal is through a liquid contact system in which slow-moving contact with cleaning water is alternated with intimate turbulent contact. The circular motion continues by itself through multiple stages. The circular air flow travels in a generally downward direction through a multiplicity of stages to a water and contaminant receiving tank and then the air and some water are drawn upwardly through an internal co-axial outlet of expanding diameter so that only the air is removed.

It will be noted that the scrubbing unit of this invention serves to provide multi-stage contact between the liquid and the contaminated air in which there are alternately slow-moving circular motions followed by high-speed turbulent compressive actions providing for the greatest possible admixture.

19 Claims, 5 Drawing Figures

MULTI-STAGE AIR SCRUBBING UNIT

BACKGROUND OF THE INVENTION

Various air scrubbing devices exist today and are on the market. In general, those which utilize water of some form to remove the contaminant from the air admix the air and water through turbulent procedures. They do not utilize the advantages of a slow-moving circular air stream giving the time and lesser velocity needed for the water to impinge upon the contaminants and adhere to them, coupled with a continuing annular compression factor, to force additional particles together.

Prior art devices include cleaners with circular air flow such as those shown in Seymour U.S. Pat. No. 1,130,849, Fisher U.S. Pat. No. 2,354,674, Johnstone U.S. Pat. No. 2,604,185, Gordon U.S. Pat. No. 2,807,450, and Jepsen U.S. Pat. No. 3,488,927. Annular cleaners with vanes to create the circular motion include Smith U.S. Pat No. 2,728,409 and Pearl U.S. Pat. No. 3,348,830. Scrubbers with reversing air flow include Fisher U.S. Pat. No. 2,259,032, Smith U.S. Pat. No. 2,728,409 and Gordon U.S. Pat. No. 2,807,450. Various water washing techniques are shown in many of the above patents, McIlvaine U.S. Pat. No. 3,077,714 and Wisting U.S. Pat. No. 3,336,733.

SUMMARY OF THE INVENTION

In the present invention turbulence and circular motion are uniquely coupled so that a circular-turbulent scrubbing continues through a series of stages, all driven by the same fan and using relatively low energy consumption. This results in efficient removal of solid and liquid particles and gases from contaminated air. The unit utilizes a generally cylindrical air scrubbing chamber having a co-axial internally-positioned outlet tube therein. Air enters the chamber at the upper portion, directed off-center for circular motion, and moves downwardly to the entrance of the outlet tube. It then moves upwardly through the outlet tube for discharge. At the point of initially entering the chamber the air is sprayed with water from nozzles, steam or other liquid, preferably of a particle size to match the particles anticipated in the contamination.

As the air enters the upper portion of the scrubbing chamber and commences its circular motion, it enters a chamber with a large volume and so can move relatively slowly. This gives it an opportunity to better combine with particles of water.

The air scrubbing tank is divided into a series of chambers, providing stages. This division occurs through dividing plates passing between the outlet tube and the side surface of the air scrubbing tank. These plates leave a small gap to separate the tank into different chambers and, since the gap is circular in form, the circular motion of the air and water mixture is carried through the gap. Preferably, dividing plates are angled upwardly from the surface to which they are affixed so as to form a trough-like structure which can hold water and have turbulent mixing. This water will normally revolve about the unit.

The air and water mixture passes from the first chamber through the narrow gap and so is squeezed together, the water being drawn off the trough by motion of the air. As a result, the air and water are squeezed together and given accelerated motion as they pass through the gap to a second chamber. On the lower side of the gap, the air and water mixture rapidly expands, in a semi-explosive way, but, nevertheless, continues its circular motion. Circular motion being slower, there is additional opportunity for admixture in the second chamber also.

The second chamber has a divider at its lower portion providing a similar gap for a similar squeezing motion. Such process of alternating annular chambers with dividers having ring-like gaps therein can be repeated for as many stages as is desired.

The air then passes downwardly toward the entrance to the outlet tube, enters the outlet tube and is drawn upwardly and removed. Positioned below the outlet tube, however, is a circular trough-shaped structure with an open bottom. The air can pass on either side of this structure prior to entering the outlet tube. It must, in either event, pass through a "waterfall" formed either by the water flowing downwardly along the inside of the outlet tube and dropping from it or dropping through the hole in the bottom of the circular trough. This provides an additional scrubbing.

In either event the water eventually ends up in a tank positioned below the scrubber. Sediment settled from this tank may be withdrawn at the bottom and the cleaner water withdrawn from the top and recycled, if desired.

The outlet tube is of narrower diameter toward the bottom than it is at the top. Consequently, the pressure on the air drawing it upwardly is greater at the bottom than it is at the top and so a certain amount of water will be sucked upwardly creating a vortex in the lower portion of the outlet tube for further scrubbing action. As the outlet tube begins to have a greater diameter, the pressure becomes less per square inch and, in due course, can not carry the water upwardly further. In addition, if desired, the outlet tube may contain (toward the top) a water condenser unit to form a surface for any remaining water in the air to be condensed. This can take the form of a mesh basket carrying any desired packing material.

An outlet fan is positioned in the upper end of the outlet tube, and it is this single fan that causes contaminated air and water spray to flow through the unit.

DETAILED DESCRIPTION OF THE INVENTION

Referring to the drawings:

FIG. 4 is a detailed view showing portions of a circular trough at the base of the outlet tube showing action of the water therein.

Figure 1:
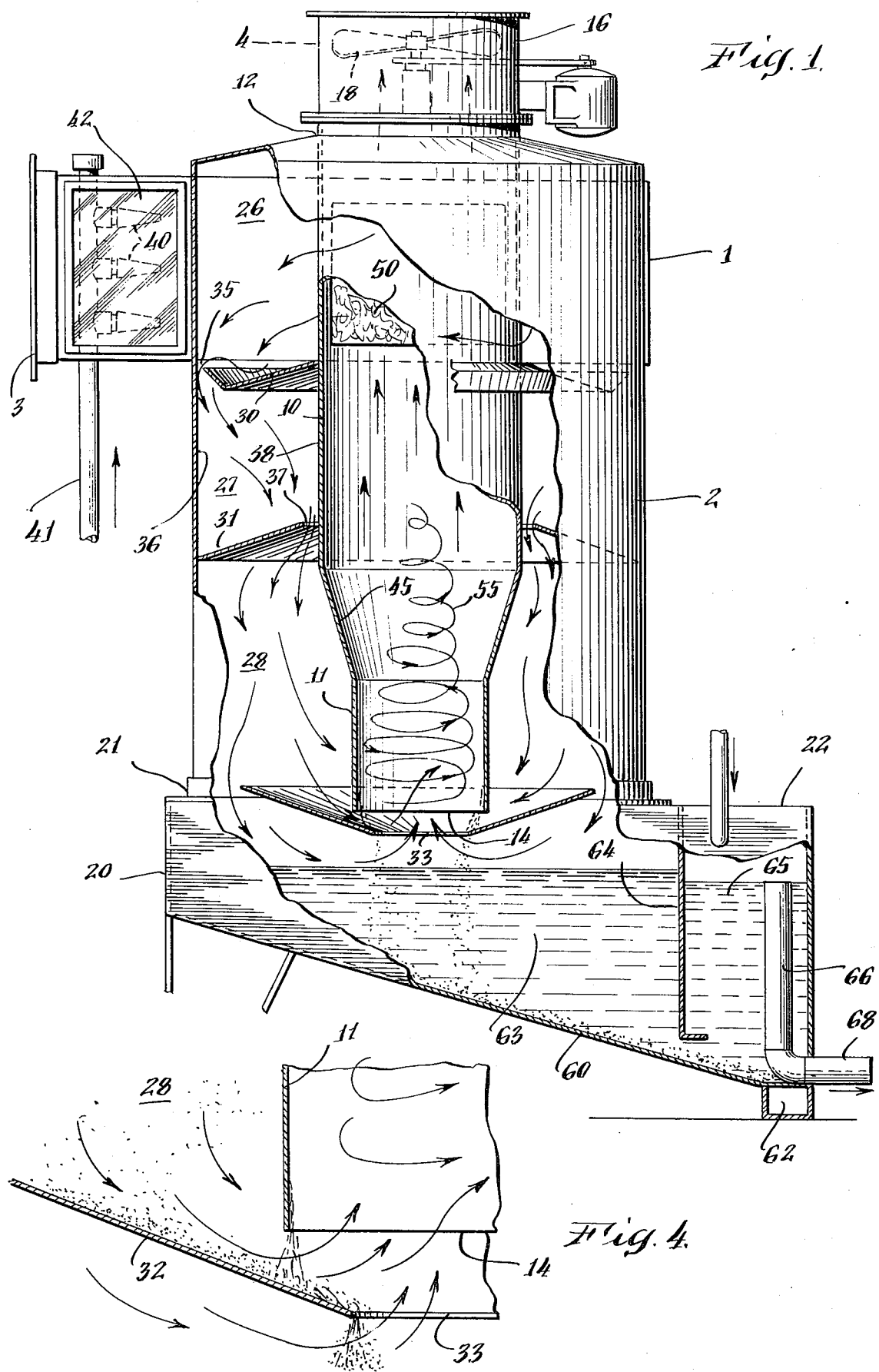
FIG. 1 is a side elevation of the air scrubber unit of this invention partially broken away to show the details of the internal structure and operation.

Turning to FIG. 1, the air scrubber unit is generally depicted by the numeral 1. It includes a cylindrical scrubbing tank 2 having a vertical axis, an air inlet 3 to receive the contaminated air, and an air outlet 4 for scrubbed air. Outlet tube 10 is positioned within scrubbing tank 2 and is co-axial with it. Tube 10 is welded or otherwise sealed to tank 2 as it passes through the top of tank 2, with the welding occurring along line 12. The lower end 14 of tube 12 is open to receive an upwardly flowing stream of air mixed with water or other liquid. The upper end 16 of outlet tube 10 is connected to outlet fan 18 at outlet 4.

Tank 2 is secured at its lower end to a water and contaminant-receiving tank 20. This occurs at point 21 and may be assembled by welding or other means. The total unit is sealed so that air entering inlet 3 must pass through the entire unit and in due course exit through outlet 4, the only opening to the unit (other than for access for maintenance purposes) is at the upper right-hand portion 22 of tank 20 (as shown in FIG. 1). This does not result in changing the airflow through the unit since this exit is blocked by the level of water.

Scrubber tank 2 is divided into a series of separate chambers 26, 27, and 28 by circular dividers 30 and 31, that are to be described below. Divider 30 separates chamber 26 from chamber 27, and divider 31 separates chamber 27 from 28. The open-ended circular trough previously mentioned is shown below inlet 14 to outlet tube 10 and may, if desired, be supported by height adjusting brackets connecting trough 32 and the lower end about that tube 10 (brackets not shown).

The water spray for the incoming air comes from nozzles 40 fed by water inlet tube 41. The nozzles are shown behind a glass viewing window 42.

The unit and its operation can best be described by considering air and water flow patterns.

THE AIRFLOW PATTERN

Figure 2:
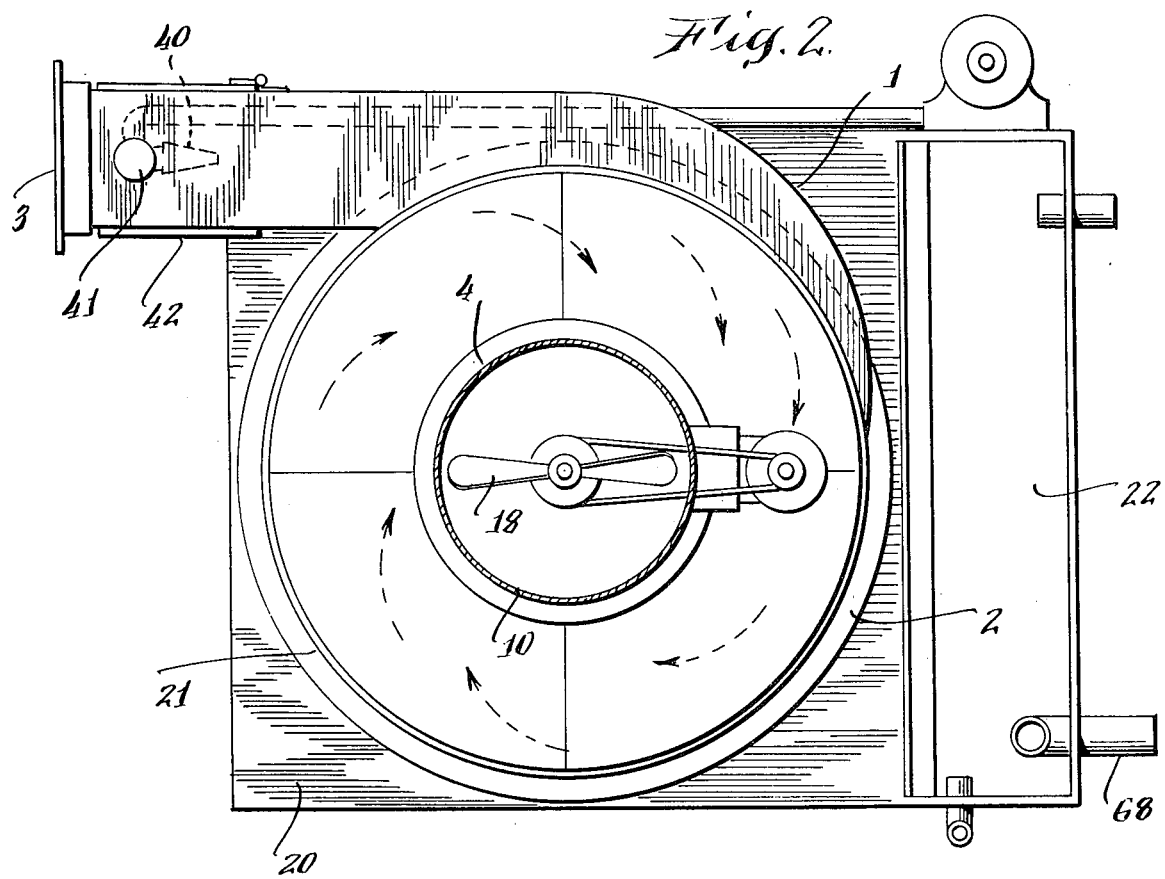
FIG. 2 is a plan view of the same unit.
Figure 3:
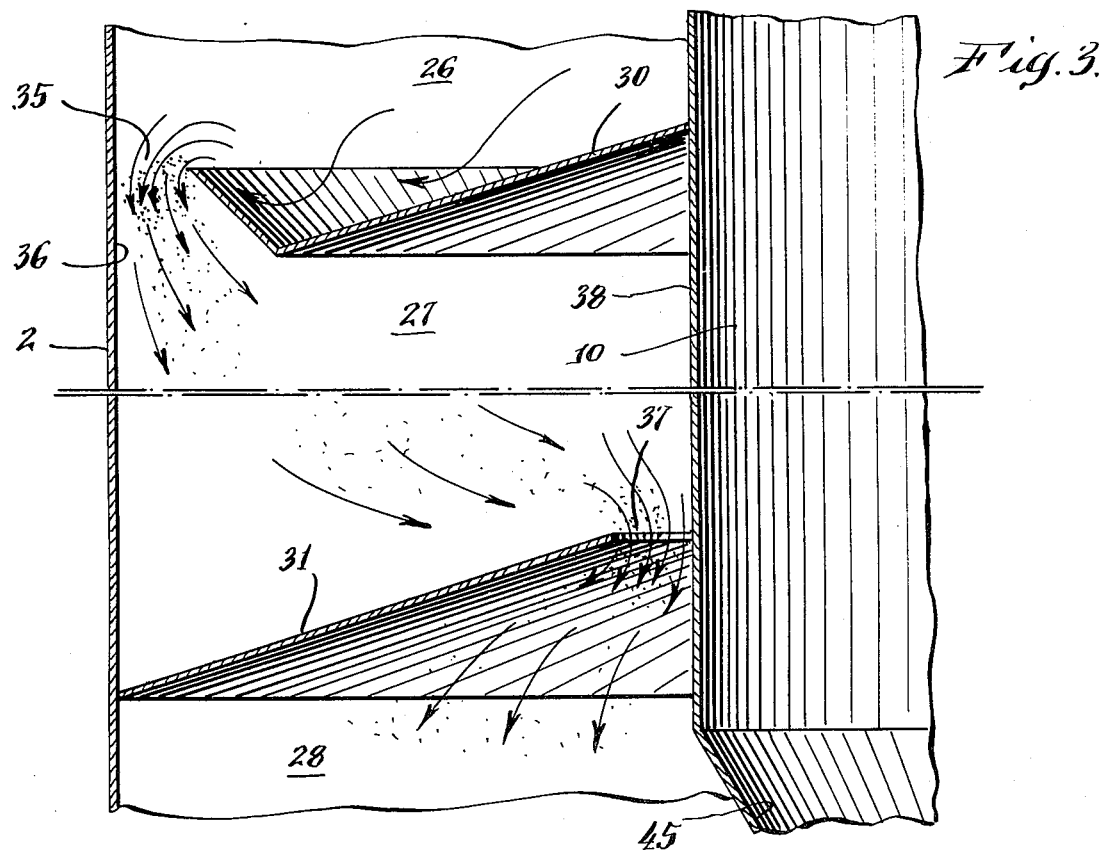
FIG. 3 is a detail showing the action of the air-water mix as it moves through the circular gaps caused by the divider strips and is washed by water passing out of the trough.

Air enters through inlet 3 and is drawn into inlet 3 by the negative pressure created by outlet fan 18. Since inlet 3 is positioned to one side, it directs the air in a circular pattern (the air passes in a circular manner through chamber 26 in the direction shown by the dotted arrows in FIG. 2). The only exit in chamber 26 is around the end of divider 30 through the gap 35 formed between divider 30 and the inner surface 36 of cylindrical tank 2. After passing through gap 35, the air enters chamber 27 and continues the same circular rotational flow within chamber 27, since the rotational movement is carried through gap 35. It then is drawn through gap 37 formed between the inner end of divider 32 and the outer surface 38 of outlet tube 10. The gap 37 is also circular as is gap 35 and consequently the rotational movement continues through the gap.

It will be noted, as will be described later, that water which is collected on the tops of dividers 30 and 31 also passes through gaps 35 and 37. After having passed through gap 37, the air enters chamber 28, passes either above or below circular trough 32 and enters tube 11 through lower opening 14, still continuing its rotational movement.

The air passes upwardly through outlet tube 10 and condensation packing 50, the outlet end 16, outlet fan 18 and the outlet itself 4. It has been found that by this time, a high percentage of the contaminants have been removed from the air.

THE WATER FLOW PATTERN

Water, steam, solvent, water mixed with detergent, or other liquid may be used in the scrubbing process for the contaminated air. For the sake of simplicity the process will be described using water.

The cleaning process consists essentially of dissolving the contaminants in the water, or otherwise adhering the water to the contaminants, and the separating the water and the air.

The water enters the system through water inlet pipe 41 shown in FIG. 1 and is sprayed in atomized form into the incoming air system through nozzles 40. Pressure of the incoming water and the size of the spray nozzles are designed to match the nature of contamination. The water enters the air stream in particle sizes that have a mass roughly equal to the mass of the contaminants. This serves to aid impingement of the liquid droplets and the contaminants and enhances the likelihood that they will not separate.

After the water enters the air stream, the two are carried into the upper chamber 26 of scrubber tank 2. The volume of chamber 26 is such that it allows the air and water mixture to slow its motion and, as mentioned previously, the travel is in a circular pattern. The direction of travel is shown in plan view of FIG. 2 as being clockwise (which would mean that, in FIG. 1, it is travelling away from the observer on the left-hand portion of chamber 26 and toward the observer on the right-hand portion of 26). This relatively slow circular motion allows more time for the particles of water to impinge upon the particles of contaminants and adhere.

In addition, the motion of the water throughout the chamber is such that a certain percentage of it will impinge on the inner surface 35 of scrubber tank 2 and on the outer surface 38 of outlet tube 10. These surfaces will remain wet throughout all of the stages of operation of the scrubber. By remaining wet, this provides an additional basis for removal of contamination in the air.

The water on the outer surface 38 of tube 10 will drain downwardly into the divider 30 which forms a trough and will fill the trough. The rotary air movement in chamber 26, however, will cause the water in the trough to rotate in the same direction as the air and will create a certain degree of turbulence therein, which further enhances the scrubbing action.

Since the airflow from chamber 26 must pass through gap 35, there is an accelerated motion of the air through that gap. This serves to draw the water from trough 30 through gap 35. It will be noted that trough 30 has a downwardly extending portion toward the center and an upwardly extending portion toward its periphery. By adjusting the angle of the upwardly extending portion so that it tends slightly above the horizontal but is not too sharp (the proper angle can be readily ascertained by experimentation and will be determined by the selected volume of water and air, the rates of flow, and the size of the gap 35), sufficient water will be drawn from trough 30 and will draw with it any contaminant particles in the trough, thus making it self-cleaning.

In passing through gap 35 between trough 30 and inner surface 36, the air-water motion is accelerated, due to the narrowness of the gap, and the air is somewhat compressed in its admixture with the water. This serves to further remove contaminants from the air.

Just after passing through gap 35 the air-water mixture rapidly expands to fill chamber 27 and, it has been found, that the rotary motion found in chamber 26 will be carried through to chamber 27. The result will mean that the air-water mixture in chamber 27 continues to move in a circular fashion, and is again reduced in speed so that it can have time for the water to mix with the air and remove contaminants. Once again, it will be noted that the inner surfaces 36 and 38 will be wet and so provide an additional scrubbing action.

Divider 31, at the base of chamber 27, serves as a second trough comparable to trough 30, except in this instance is affixed to the inner surface 36 of the scrubber tank with the gap 37 being adjacent to the outer surface 38 of outlet tube 10.

Divider 31 will fill with water, and is set at such an angle that the air-water movement through gap 37 will have a cleaning effect on trough 31.

Once again, the air-water mixture passing through gap 37 is compressed providing for greater contact between the air and water; and once again, having passed through the gap it expands, moves more slowly, and continues its circular motion.

It will be noted at this time that this multi-stage approach toward air scrubbing has involved alternating slow, low pressure motion for low speed impingement of contaminants and water high-speed pressurized gap passage movement. Also, due to the location of the gaps 35 and 37, first on the outer periphery and then on the inner periphery, there is radial motion inwardly and outwardly which provides for an additional admixture.

Having passed through gap 37, the air-water mixture continues to expand into chamber 28. The flow then divides, a portion passing above circular trough 32 and a portion below. The portion passing above trough 32 enters directly into inlet 14 of outlet tube 11. That passing below 32 also passes through opening 33 at the base of trough 32 before entering inlet 14. The water in the air-water mixture in chamber 28 either remains admixed with the air or settles on the inner surface 36 of scrubber tank 2, the outer surface 38 of outlet tube 11, or the upper surface of trough 32. That water which is on the inner surface 36 will flow downwardly into tank 20. The water on the surface 38 will flow down the outside portion of the lower end of outlet tube 11 and will drop with a "waterfall" effect into trough 32. This waterfall is further enhanced as will be described below from water flowing down the inner surface 45 of outlet tube 10. Thus, the air which passes above trough 32 must go through a further cleansing flow of water. This water additionally flows down the trough 32 to its opening 33 and forms an additional waterfall so that the air which passes from chamber 28 below trough 32 must pass through this in order to reach opening 14 in outlet tube 10.

The water flowing from trough 32 falls into tank 20 from which it is, in due course, removed.

As the air is drawn upwardly through outlet tube 10, there is a continuing vortex to the circular motion.

To the extent that there is still water in the air, it is carried upwardly by the negative pressure created by outlet fan 18, and a vortex 55 is created. Since the tube 10 has an increasing diameter as the tube rises, the pounds per square inch of vacuum pressure reduces as the air rises. Consequently, the air is unable to carry the water, and the vortex ceases. For the most part the water will settle on the inside surface 45 of tube 10 and flow downwardly as previously described.

Any remaining water in the system is removed by water extracter 50 positioned in the upper portion of tube 10 and generally will flow downwardly along the inner surface 45 of tube 10.

The remaining pattern of water flow is exemplified by the collection of the water and contaminants in tank 20.

Preferably tank 20 has a sloping bottom 60 so that solid contaminants will tend to flow to one end of the tank. It has a removal drain 62 at the lower portion for the removal of the solids.

The tank also has a divider strip 64 secured at its upper end in an airtight manner to the base of tank 2. Divider strip 64 leaves a small gap 65 at the bottom between the lower end of strip 64 and the bottom 60 of the tank. It is through this gap that water and contaminants to be removed from the system are removed. Thus, tank 20 is divided into two compartments, the left-hand one below the air scrubber being identified as 63, and the right-hand one to the right of the divider 64 being identified as 65.

A water removal drain 66 is mounted in section 65 to drain off the water through outlet pipe 68.

It will be noted that the water level in section 63 is higher than the water level in section 65, simply due to the reduced air pressure in section 63 caused by the outlet fan 18 causing reduced pressure within the system.

Figure 5:
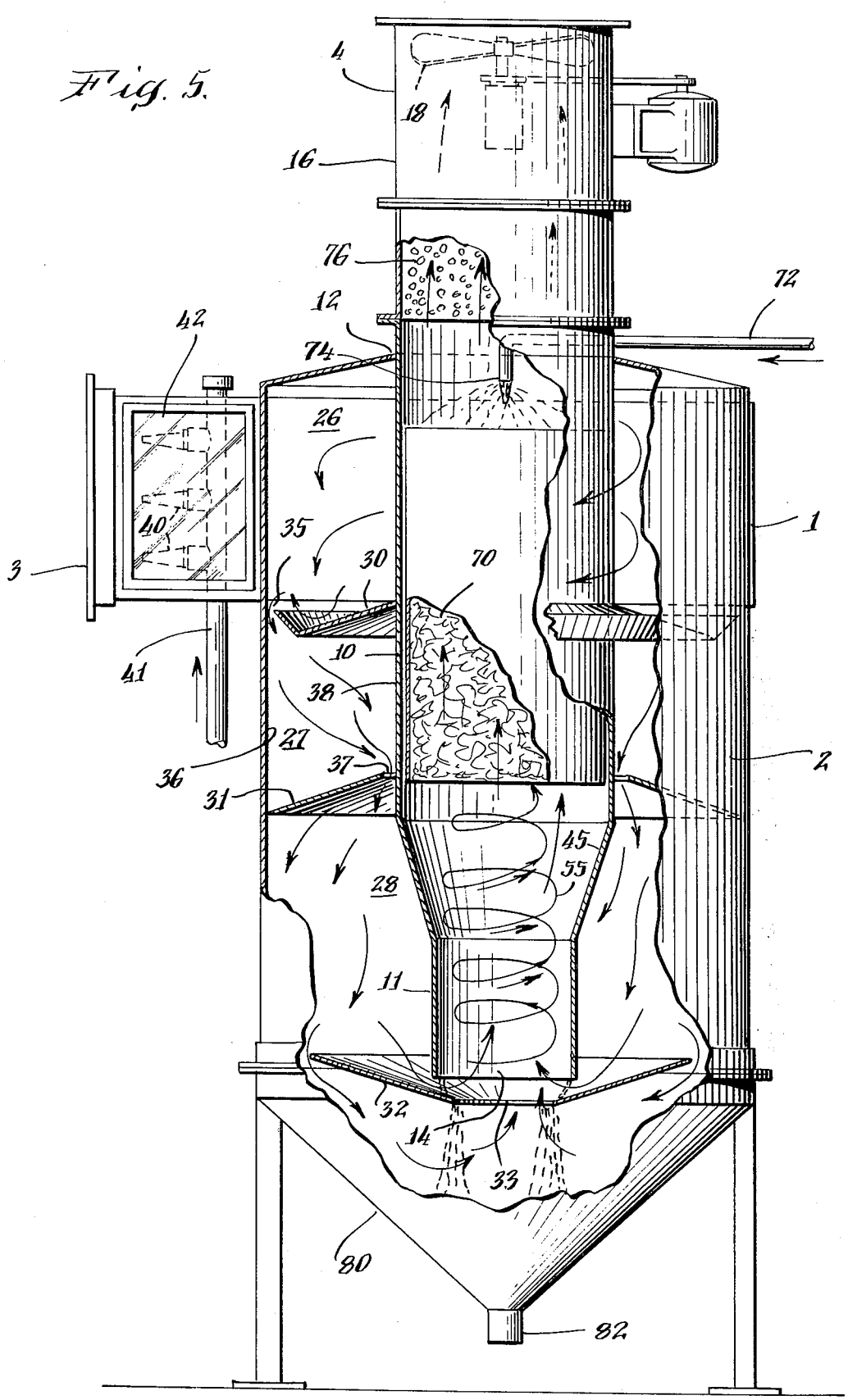
FIG. 5 is similar to FIG. 1 but shows a modification usable when steam, rather than water, is the scrubbing agent.

FIG. 5 shows a modification of the scrubber where steam instead of water is used to clean the air. It is, except in the respects described below, the same as the previously described version and so, accordingly, similar numbering is used and the description of operation need not be repeated.

When using steam to remove particulate matter it is preferable to have the steam enter the air stream in the direction opposite to the direction of the air stream and so the nozzles 40 are shown in reverse direction. When used to remove contaminants that are primarily solvents, it is preferable to have the nozzles directing the steam in the same direction as the air stream, such as is shown in FIG. 1. The steam used would normally be at a temperature of between 250° and 500° F as it enters through inlet 41. So that the steam may condense and be removed, the fractionating column 70 is placed within outlet 10 in its upper portion and a method of inserting cold water or refrigerant is provided. This is done through inlet 72 leading to spray nozzle 74 positioned above the fractionating column. A final moisture extractor 76 is placed above nozzle 74 within the outlet tube 10.

Thus, in operation, the unit works in substantially the same fashion as the unit of FIG. 1 except that steam is used and means are provided to be certain that the steam is condensed and removed from the cleaned air.

When the material being removed is primarily a solvent, the sump may be of an inverted conical shape such as sump 80 in FIG. 5. In such event, the outlet for waste or salvage would be a tube 82 at the bottom with the necessary valving structure.

SUMMARY

Consideration of the above description shows that a unified operation for air scrubbing has been provided by a technique having multi-stage circular airflow with the circular aspects themselves carrying rotational motion through from stage to stage. The circularity results in substantially the entire volume of each of the chambers as well as their wetted inner surfaces serving a cleaning function. Though the operation is seriatim, the stages are inter-related through this carry-through of rotational motion.

I claim:

1. An air scrubber adapted to remove contaminants from air through use of multiple cleaning stages including;

a vertically-positioned cylindrical scrubbing tank, an air inlet means at the upper end thereof, positioned to direct incoming air for circular motion within said tank, a generally cylindrical air outlet tube positioned within said scrubbing tank, coaxial therewith, and running the length of said scrubbing tank, said outlet tube being integral with the top of said scrubbing tank, having an air entrance at its lower end, and an air outlet at its top end, means to spray liquid into said scrubbing tank air inlet means, at least one circular divider between the inner wall of said scrubbing tank and the outer wall of said air outlet tube dividing said scrubbing tank into air cleaning chambers, said at least one divider being positioned at an angle to define, in conjunction with one of said walls, a liquid-holding trough, and said at least one divider defining an annular gap between said stages, said annular gap being narrow enough to compress the air into admixture with the liquid as they pass therethrough, a fan positioned to draw air into said inlet, through said scrubber, and out the air outlet, and a liquid receiving tank positioned at the base of the scrubbing tank and integral therewith, whereby contaminated air is drawn into said inlet means, is mixed with liquid, is given a circular motion and is scrubbed in at least two chambers, and removed from said unit through said air outlet.

2. An air scrubber as set forth in claim 1 in which said annular gap is positioned adjacent the inner wall of said scrubbing tank.

3. An air scrubber as set forth in claim 1 in which said annular gap is positioned adjacent to the outer wall of said outlet tube.

4. An air scrubber as defined in claim 1 including at least two said dividers dividing said tank into at least three cleaning chambers and in which one of said at least two dividers is positioned to define an annular gap adjacent to the inner wall of said scrubbing tank and the other of said at least two dividers is positioned to define an annular gap adjacent the outer wall of said outlet tube.

5. An air scrubber as set forth in claim 4 in which said divider defining the annular gap adjacent the inner wall of said scrubbing tank is the upper of the at least two said dividers.

6. An air scrubber as set forth in claim 1 in which said at least one divider is inclined upwardly adjacent to said narrow gap such as to permit liquid to be drawn from said trough into said gap by the motion of the air passing through said gap, whereby said trough becomes self-cleaning of contaminants.

7. An air scrubber as set forth in claim 1 including a circular trough positioned beneath and spaced from the inlet of said outlet tube, said trough being below said outlet tube and having an opening therein smaller than the opening of said inlet end of said outlet tube.

8. An air scrubber as set forth in claim 1 in which said liquid-receiving tank has removal means for solid contaminants and a bottom inclined toward said removal means.

9. An air scrubber as set forth in claim 1 in which said outlet tube is of smaller diameter at the lower end that at its upper end so that the air pressure differential in said outlet tube at its lower end is greater than at its upper end and said tube is so dimensioned relative to the pressures within the air scrubber that liquid particles will be drawn only a portion of the way upwardly into said outlet tube, whereby a scrubbing vortex is created in the lower portion of said outlet tube.

10. An air scrubber as set forth in claim 9 in which a liquid extractor is mounted in the upper portion of said outlet tube.

11. In an air scrubber adapted to remove contaminants from air through use of multiple-stage circular path cleaning stages including a vertically positioned cylindrical scrubbing tank having a central core structure the improvement including;

means extending radially outwardly relative to said central core structure for dividing said tank into a series of vertically separate chambers, said means radial to said central core structure defining dividers and providing for annular gaps between the chambers formed by said dividers said gaps being narrow enough to compress the air into admixture with the liquid as they pass therethrough, an air inlet means in the upper-most of said chambers positioned to direct the incoming air for circular flow through said upper chamber, means for introducing atomized cleaning liquid such as water, into said contaminated air as it passes through said air inlet, whereby circular motion is imparted to said air-liquid admixture as it enters the upper chamber, said dividers defining liquid retaining troughs in which the liquid can maintain the circular motion of said admixture, whereby said air and water admixture passes through successive chambers through said gaps and said circular motion continues in each successive chamber.

12. An air scrubber as set forth in claim 11 in which one of said annular gaps is positioned adjacent the inner wall of said scrubbing tank.

13. An air scrubber as set forth in claim 11 in which one of said annular gaps is positioned adjacent to the outer wall of said central core structure.

14. An air scrubber as defined in Claim 11 including at least two said dividers dividing said tank into at least three cleaning chambers and in which one of said at least two dividers is positioned such as to define an annular gap adjacent the inner wall of said scrubbing tank and the other of said at least two dividers is positioned such as to define an annular gap adjacent the outer wall of said central core structure.

15. An air scrubber adapted to remove contaminants from air through use of multiple cleaning stages including;

a vertically-positioned cylindrical scrubbing tank, an air inlet means at the upper end thereof, positioned to direct incoming air for circular motion within said tank, a generally cylindrical air outlet tube positioned within said scrubbing tank, coaxial therewith, and running the length of said scrubbing tank, said outlet being integral with the top of said scrubbing tank, having an air entrance at its lower end, and an air outlet at its top end, at least one divider between the inner wall of said scrubbing tank and the outer wall of said air outlet tube to divide said scrubbing tank into air cleaning chambers, said at least one divider being so positioned as to define, in conjunction with one of said walls, an annular gap between said stages, said gap being narrow enough to compress the air into admixture with the liquid as they pass therethrough, means to spray liquid into said scrubbing tank air inlet, a fan positioned to draw air into said inlet, through said scrubber, and out the air outlet, and a liquid receiving tank positioned at the base of the scrubbing tank and integral therewith, whereby contaminated air is drawn into said inlet, is mixed with liquid, is given a circular motion and is scrubbed in at least two chambers, and removed from said unit through said air outlet.

16. An air scrubber as defined in claim 15 including at least two said dividers dividing said tank into at least three cleaning chambers and in which one of said at least two dividers is positioned to define an annular gap adjacent to the inner wall of said scrubbing tank and the other of said at least two dividers is positioned to define an annular gap adjacent the outer wall of said outlet tube.

17. An air scrubber as set forth in claim 15 in which said outlet tube is of smaller diameter at the lower end than at its upper end so that the air pressure differential in said outlet tube at its lower end is greater than at its upper end and said tube is so dimensioned relative to the pressures within the air scrubber that liquid particles will be drawn only a portion of the way upwardly into said outlet tube, whereby a scrubbing vortex is created in the lower portion of said outlet tube.

18. An air scrubber as set forth in claim 15 in which said means to spray liquid provides atomization of the liquid to sizes comparable to those of the contaminant particles to be removed.

19. An air scrubber as set forth in claim 15 in which said liquid is steam and said means to spray liquid sprays said steam in a direction opposing that of the incoming air.

* * * * *